United States Patent
Francz

(10) Patent No.: US 9,316,348 B2
(45) Date of Patent: Apr. 19, 2016

(54) POSITIONING DEVICE FOR POSITIONING AN EJECTION DEVICE FOR EJECTING A MOVABLY MOUNTED PART OF A PIECE OF FURNITURE

(71) Applicant: Julius Blum GmbH, Hochst (AT)

(72) Inventor: Thomas Francz, Hohenems (AT)

(73) Assignee: JULIUS BLUM GMBH, Hochst (AT)

( * ) Notice: Subject to any disclaimer, the term of this patent is extended or adjusted under 35 U.S.C. 154(b) by 435 days.

(21) Appl. No.: 13/845,581

(22) Filed: Mar. 18, 2013

(65) Prior Publication Data

US 2013/0214219 A1   Aug. 22, 2013

Related U.S. Application Data

(63) Continuation of application No. PCT/AT2011/000411, filed on Oct. 4, 2011.

(30) Foreign Application Priority Data

Oct. 15, 2010   (AT) ................ A 1719/2010

(51) Int. Cl.
   *A47B 88/00*   (2006.01)
   *F16M 13/02*   (2006.01)
   (Continued)

(52) U.S. Cl.
   CPC ............ *F16M 13/02* (2013.01); *A47B 88/0477* (2013.01); *E05F 1/00* (2013.01)

(58) Field of Classification Search
   CPC ............ A47B 88/047; A47B 88/0474; A47B 88/0477; A47B 88/0481
   USPC ............ 312/333, 334.1, 334.7, 334.8, 334.6, 312/334.44, 319.1, 205, 334.13, 312/319.5–319.8; 248/200, 300
   See application file for complete search history.

(56) References Cited

U.S. PATENT DOCUMENTS 5,012,936 A * 5/1991 Crum .................. A47F 1/126
                                                           206/556
5,357,819 A * 10/1994 Takei .................. B23Q 5/38
                                                           108/143
(Continued)

FOREIGN PATENT DOCUMENTS

AT   010 312   1/2009
AT   505 970   5/2009
(Continued)

OTHER PUBLICATIONS

Chinese Search Report issued Jul. 16, 2014 in corresponding Chinese Application No. 2011800492852.

(Continued)

*Primary Examiner* — Janet M Wilkens
(74) *Attorney, Agent, or Firm* — Wenderoth, Lind & Ponack, L.L.P.

(57) ABSTRACT

A positioning device positions an ejection device for ejecting a movably mounted part of a piece of furniture from a closed end position in relation to a body of a piece of furniture. The ejection device can be fixed in relation to the body of the piece of furniture by an adapter plate. The adapter plate includes at least two guides, one of the guides being respectively connectable to a bearing part fixed to the body. The at least two guides can be used to position the ejection device in at least two different depth positions on or in the body of the piece of furniture.

12 Claims, 12 Drawing Sheets

(51) Int. Cl.
*A47B 88/04* (2006.01)
*E05F 1/00* (2006.01)

(56) References Cited

U.S. PATENT DOCUMENTS

| | | | |
|---|---|---|---|
| 8,690,269 B2 * | 4/2014 | Rock | 312/319.7 |
| 2004/0245197 A1 * | 12/2004 | McElvaney | A47F 1/125 211/184 |
| 2007/0145867 A1 * | 6/2007 | Gasser | A47B 88/0477 312/223.6 |
| 2009/0039745 A1 | 2/2009 | Wong | |
| 2009/0127992 A1 | 5/2009 | Ritter | |
| 2009/0206715 A1 * | 8/2009 | Scheffknecht et al. | 312/319.8 |
| 2009/0273262 A1 | 11/2009 | Brustle | |
| 2009/0284114 A1 | 11/2009 | Fitz | |
| 2010/0084954 A1 * | 4/2010 | Schneider et al. | 312/319.1 |
| 2010/0090570 A1 | 4/2010 | Schneider | |
| 2010/0194256 A1 * | 8/2010 | Grabherr | 312/319.1 |
| 2011/0309729 A1 * | 12/2011 | Gasser | 312/319.1 |
| 2013/0221821 A1 * | 8/2013 | Taimler | 312/334.1 |

FOREIGN PATENT DOCUMENTS

| | | |
|---|---|---|
| CN | 101605479 | 12/2009 |
| CN | 101674756 | 3/2010 |
| DE | 20 2005 021 123 | 3/2007 |
| DE | 20 2006 006 187 | 8/2007 |
| DE | 20 2007 006 300 | 6/2008 |
| DE | 20 2008 016 464 | 5/2009 |
| WO | 2008/101261 | 8/2008 |
| WO | 2009/023378 | 2/2009 |

OTHER PUBLICATIONS

International Search Report (ISR) issued Feb. 16, 2012 in International (PCT) Application No. PCT/AT2011/000411.
Austrian Patent Office Search Report completed May 20, 2011in Austrian Patent Application No. A 1719/2010.

* cited by examiner

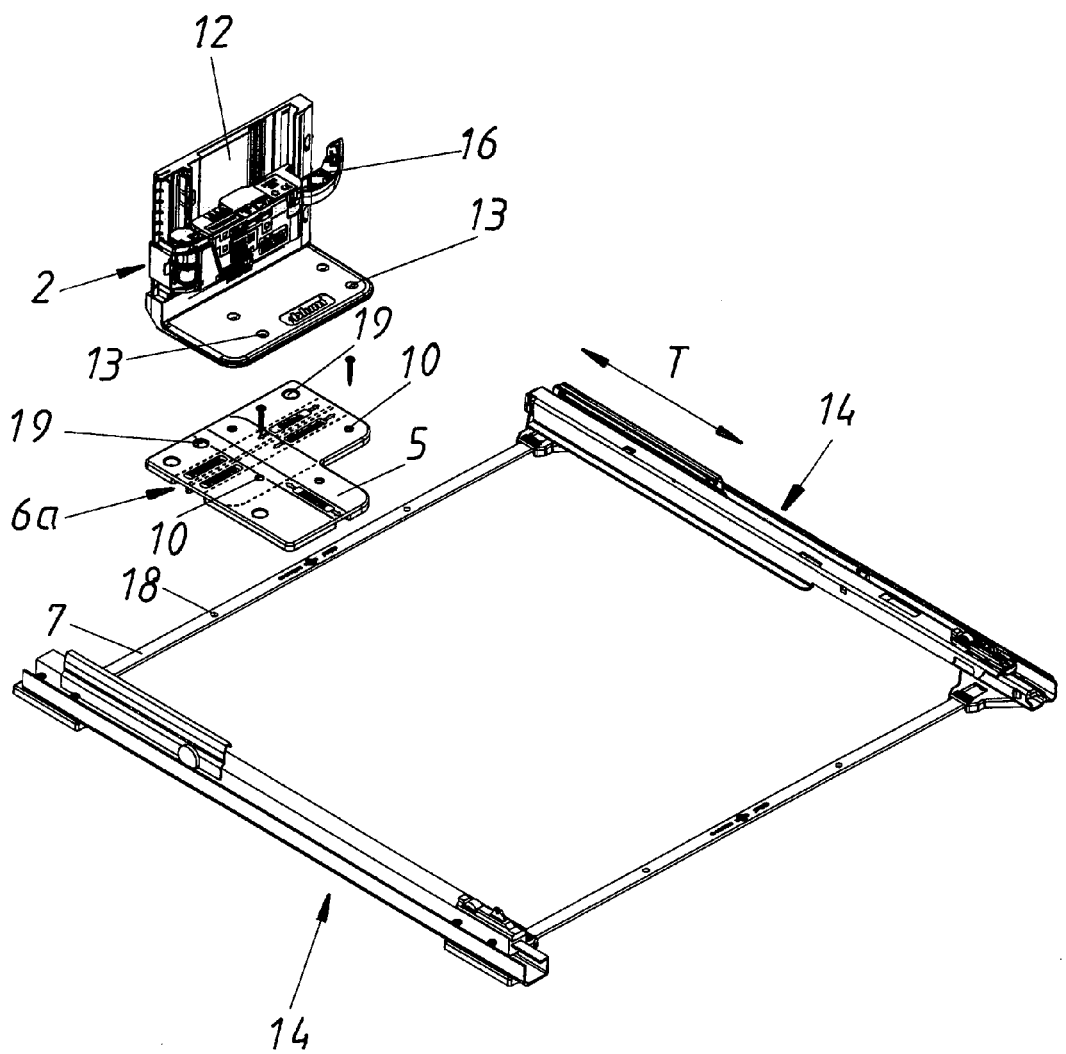

POSITIONING DEVICE FOR POSITIONING AN EJECTION DEVICE FOR EJECTING A MOVABLY MOUNTED PART OF A PIECE OF FURNITURE

BACKGROUND OF THE INVENTION

The invention concerns a positioning device for positioning an ejection device for ejecting a movably mounted furniture part from a closed end position relative to a furniture carcass, and the ejection device can be fixed by way of an adaptor plate relative to the furniture carcass.

The invention further concerns an arrangement comprising a positioning device of the kind to be described and an article of furniture comprising such an arrangement.

Devices for positioning ejection devices for ejecting movably mounted furniture parts from a furniture carcass are already known. When fitting ejection devices, in particular in respect of articles of furniture in cabinet form, those devices are used with one or more drawers. The drawers are respectively movable from their closed end positions relative to the furniture carcass of the article of furniture into an open position, by ejection devices associated with the respective drawers. That can be effected for example by an ejection element of the ejection device, for example an ejection lever, bearing against the rear wall of the drawer in the closed end position thereof and pressing against that rear wall upon activation so that the drawer is ejected from the furniture carcass in the opening direction. Precise positioning of the ejection device relative to the drawer is therefore of great significance as the quality of ejection is influenced by the position of the ejection device relative to the drawer. If the ejection lever of the ejection device is spaced excessively far from the rear wall of the drawer, then the ejection lever cannot deploy its full ejection action. If the ejection lever does not bear centrally against the rear wall of the drawer, then the drawer can tilt upon being ejected. If the ejection lever is positioned too near to the rear wall then, in the case of an ejection device having a so-called touch-latch functionality, a malfunction can occur as in that way the triggering travel of the ejection lever, that is required for recognizing ejection triggering, is possibly no longer available. It is only by exact positioning of an ejection device relative to the drawer that it is possible to ensure that the aforementioned disadvantages can be avoided and the ejection device can eject the drawer in the proper fashion.

AT 505 970 A1 discloses a carrier structure for at least one ejection device, that carrier structure including a carrier rail and two fixing devices. In an embodiment in that respect, a first fixing device is fixed to the floor of the carcass and a second fixing device is fixed to the rear wall of the carcass. Adjustment of the depth position of the ejection device in relation to the movable furniture part can be effected by a mounting portion of the second fixing device. In that case, a certain degree of adjustment can admittedly occur in the depthwise direction of the furniture carcass, but that is effected only in a relatively small range as the first fixing device is fixed fixedly and immovably to the carcass floor. Overall the assembly complication and expenditure for the carrier structure of the ejection devices is relatively high as firstly the first fixing device has to be fixed to the furniture carcass floor and then the second fixing device has to be fixed to the carcass rear wall. The carrier rail can then be fitted between those two fixing devices, in which case adjustment can be effected in the depthwise direction by the second fixing device. In that case, for mounting the carrier rail in accurately fitting relationship between the two fixing devices, an increased level of complication and expenditure is required in regard to measuring and fixing the two fixing devices to the furniture carcass.

Further positioning devices for positioning an ejection device are described in DE 20 2006 006 187 U1, AT 010 312 U1, WO 2008/101261 A1 and DE 20 2008 016 464 U1. The positioning devices set forth therein also require an elevated level of measurement and assembly complication.

SUMMARY OF THE INVENTION

Therefore, the object of the present invention is to provide a positioning device which is improved over the state of the art for positioning an ejection device for ejecting a movably mounted furniture part from a closed end position relative to a furniture carcass. In particular, the invention seeks to provide that positioning is effected with the minimum possible amount of measurement and assembly complication. The invention also seeks to provide that this contributes to very substantially eliminating possible sources of error when mounting ejection devices. The invention further seeks to make it possible that ejection devices for movable furniture parts, in particular drawers, of different nominal lengths and irrespective of the guide system used, can be very easily positioned so that they can bring about the ejection operation in the desired fashion. In that respect, the invention also seeks to provide that positioning is possible irrespective of the material of the movable furniture part, in particular irrespective of the material of the rear wall of a drawer like for example wood or steel. In addition, the invention seeks to provide that with a positioning device according to the invention, ejection devices can be positioned, in connection with a large number of furniture carcasses, irrespective of the structures thereof, in particular irrespective of whether a rear wall is or is not present in a furniture carcass.

According to the invention, therefore, the adaptor plate has at least two guides, of which a respective one can be connected to a mounting portion which is fixed with respect to the carcass. The ejection device can be positioned by the at least two guides in at least two mutually different depth positions on or in the furniture carcass.

The ejection device can be arranged, for example, on a carrier element, for example on an angle mounting bracket. To be able to eject a drawer from a furniture carcass in the appropriate fashion, the ejection device must be arranged in a suitable position relative to the drawer in its closed end position.

With the positioning device proposed, that is achieved in that an adaptor plate is mounted to a mounting portion which is fixed with respect to the carcass and then the carrier element to which the ejection device is mounted is arranged on the adaptor plate. In that case, the mounting portion which is fixed with respect to the carcass can be fixed to the cabinet floor. At its underside, the adaptor plate has at least two guides, and the adaptor plate can be mounted selectively by one of those guides respectively on the mounting portion which is fixed with respect to carcass. By those two guides, the ejection device can in principle be positioned in two different depthwise positions relative to the closed end position of a drawer mounted movably in the furniture carcass. In that way, it is possible for example for drawers of different rear wall thicknesses to be ejected by the ejection device without having to position differently the mounting portion which is fixed with respect to the carcass. In that case, the first guide can be provided for a drawer with a rear wall of wood and the second guide can be provided for example for a drawer with a rear wall of steel. The two rear walls are of differing thicknesses and as a result require different positions for the ejection device with respect to the respective rear wall so that the drawer can be ejected in the appropriate proper fashion. Thus, the choice of the appropriate guide of the adaptor plate makes it possible to ensure that this gives both the corresponding accurate position of the ejection device for ejection of the drawer and also the triggering travel required for a touch-latch functionality of the ejection device, for the ejection element of the ejection device, irrespective of the material or thickness of the rear wall of the drawer. In dependence on the selected guide of the adaptor plate, the ejection device is in a given depthwise position in relation to the furniture carcass so that, in conjunction with a selected drawer guide system and/or the selected drawer structure, it is possible to ensure that the required triggering travel for activation of the touch-latch function is afforded and the drawer can be properly ejected.

The adaptor plate can also have both mounting locations for the carrier element and also fixing locations, by which the adaptor plate can be screwed to the furniture carcass, in particular to a cabinet floor thereof. By virtue of the mounting locations of the adaptor plate, the carrier element can be positioned for example by suitable mounting pins at the underside of the carrier element on the adaptor plate.

In an advantageous configuration of the invention, the adaptor plate has at least two guides which are arranged substantially parallel to each other. In that way, it is possible with one and the same arrangement of the mounting portion which is fixed with respect to the carcass, to select two different depthwise positions for the ejection device in the depthwise direction of the furniture carcass. As an example, a first guide of the adaptor plate affords a first depthwise position for the ejection device in relation to the furniture carcass so that a drawer with a wood rear wall can be ejected, and a second guide gives a depthwise position for the ejection device, that differs from the first depthwise position, so that a drawer with a steel rear wall can be ejected with the same drawer guide system.

A particularly advantageous embodiment of the invention is one in which the adaptor plate has at least three guides, wherein at least two guides extend substantially parallel to each other and at least one third guide is arranged substantially at a right angle to the at least two guides. In that case, the adaptor plate can have a first guide portion and at least one second guide portion which projects substantially at a right angle from the first guide portion. For example, the first guide portion has two guides extending in parallel, and the second guide portion has a third guide extending transversely relative to the two first guides. In other words, in this case with the adaptor plate, it is possible to provide three different depthwise positions for the ejection device in relation to the mounting portion which is fixed with respect to the carcass. The two parallel guides of the first guide portion afford two different depthwise positions. If the adaptor plate is turned through a notional perpendicular axis through 90° starting from a horizontal position, that makes a third guide available, which gives a third depthwise position for the ejection device, wherein that third depthwise position can be different from the two first depthwise positions.

It can naturally also be provided that both the underside and also the top side of the adaptor plate are provided with guides. Therefore, for example, at least two parallel guides are arranged at the underside of the adaptor plate and at least one further guide—extending for example parallel to the two first guides—is arranged at the top side of the adaptor plate.

In a particularly preferred embodiment of the invention, the mounting portion which is fixed with respect to the carcass is in the form of a rail which in the mounted condition is connected to two drawer extension guides which are disposed in opposite relationship on the furniture carcass. In that case, the mounting portion which is fixed with respect to the carcass and which is in the form of a rail can be fixed to drawer extension guides which are already pre-fitted in the furniture carcass, for example at the ends, which are at the rear in the depthwise direction in the mounted position, of the respective carrier rails, which are fixed with respect to the carcass, of the drawer extension guides. The region for fixing the rail to the drawer extension guides is in that case desirably selected so that it predetermines a defined location in order to make available a defined press-in travel for reliably triggering the touch-latch function for an ejection device with a touch-latch functionality in the closed end position of the drawer in the furniture carcass. In that way, the ejection device can be disposed in an accurate position in relation to the rear wall of the drawer. In addition, in that fashion, the mounting portion which is fixed with respect to the carcass and which is in the form of a rail can also always be fixed in an accurate position even in the case of drawer extension guides of different nominal lengths so that after positioning of the ejection device by the adaptor plate, the drawer can be properly ejected.

In principle, it is also possible for the mounting portion which is fixed with respect to the carcass to be pre-mounted to the drawer extension guides and subsequently thereto for that pre-mounted unit consisting of the drawer extension guides and the rail mounted transversely relative thereto to be fixed in the furniture carcass. That leads to markedly simplified positioning and fitment of the ejection device.

Protection is also claimed for an arrangement comprising a positioning device according to the invention and an ejection device. The ejection device can have at least one electric drive, by which an ejection element of the ejection device can be acted upon for the ejection of a movably mounted furniture part from a closed end position relative to a furniture carcass. It will be appreciated, however, that it is also possible to provide a different kind of drive, for example a spring drive, for acting on the ejection element of the ejection device.

BRIEF DESCRIPTION OF THE DRAWINGS

Further details and advantages of the present invention are described more fully hereinafter by the specific description with reference to the embodiments illustrated in the drawings, in which:

FIG. 5 is a perspective exploded view of a positioning device and an ejection device.

DETAILED DESCRIPTION OF THE INVENTION

Figure 1:
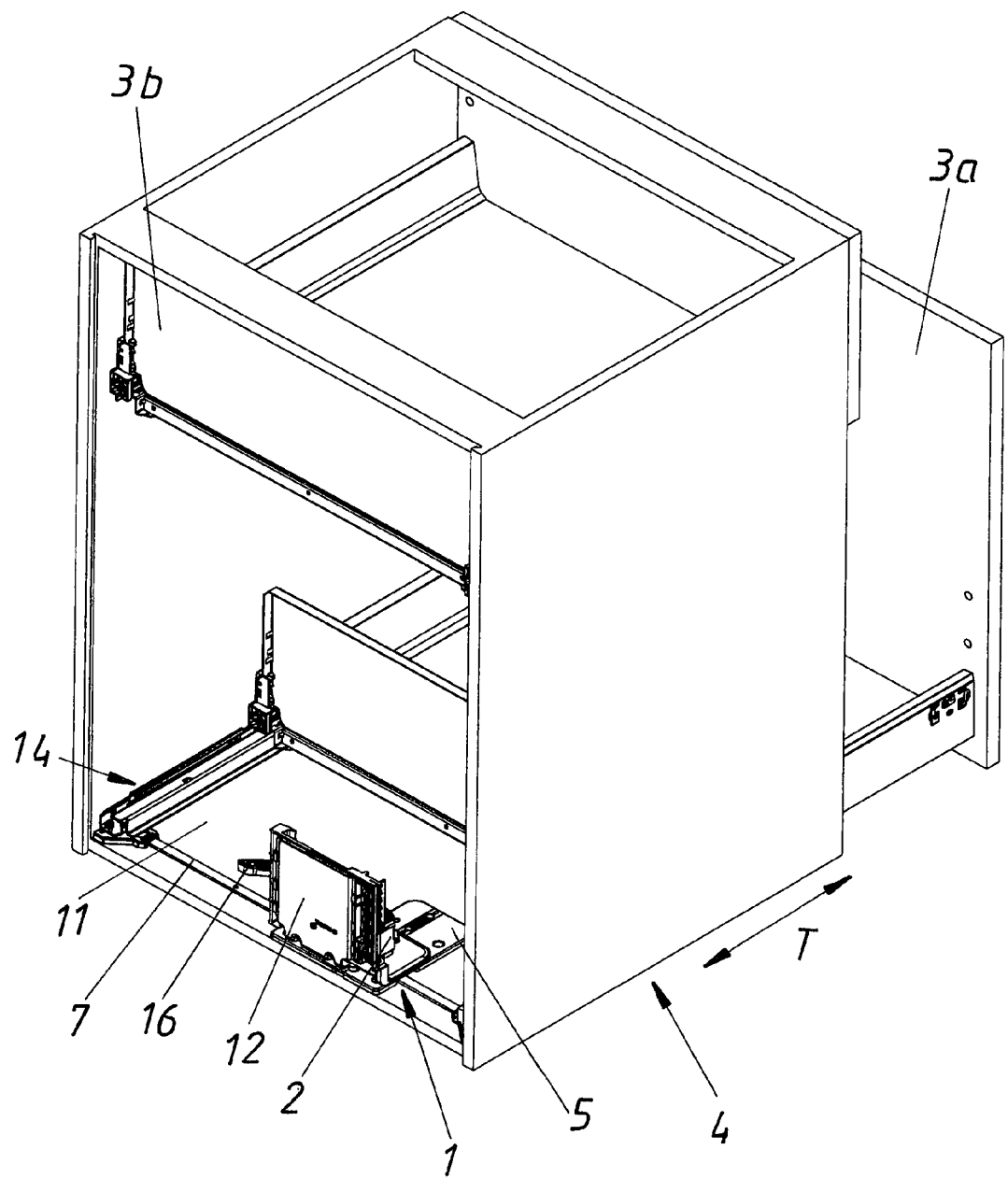
FIG. 1 is a perspective view of an article of furniture in cabinet form with an embodiment of the positioning device.

FIG. 1 is a view of an article of furniture comprising a furniture carcass 4 and two extendable drawers 3a and 3b as a perspective view from the rear. For reasons of clarity of the drawing, the rear wall of the furniture carcass 4 has been removed and the drawer 3a has been pushed a distance out of the furniture carcass 4 in the opening direction, that is to say in the depthwise direction T of the furniture carcass 4, along its drawer extension guides 14. It is possible to see here an ejection device 2 which is arranged on a carrier element 12 and which has an ejection element 16 in the form of an ejection lever which, in the closed end position of the drawer 3a, bears against the rear wall of the drawer 3a and by which the drawer 3a is movable starting from its closed end position into an open position. If the ejection device 2 is equipped with a touch-latch functionality the ejection operation can be triggered for example by manually applying pressure or a pulling force to the front panel of the drawer 3a. To be able to ensure the touch-latch function and/or correct ejection of the drawer 3a by the ejection device 2 correct positioning of the ejection device 2 in relation to the rear wall of the drawer 3a is necessary. To afford that positioning of the ejection device 2 it is proposed that the position of the carrier element 12 is fixed by way of an adaptor plate 5, relative to a mounting portion 7 which is fixed with respect to the carcass. In this example the mounting portion 7 which is fixed with respect to the carcass is in this case in the form of a rail which, extending transversely relative to the drawer extension guides 14, is fixed thereto at their rear ends in the depthwise direction T. In that way, the mounting portion 7 which is fixed with respect to the carcass and thus the ejection device 2 can always be mounted at the correct location, in particular when the situation involves different nominal lengths for the drawer extension guides 14, so that the required triggering travel for activation of the touch-latch function and ejection of the respective drawer 3 is guaranteed. An adaptor plate 5 is mounted on the mounting portion 7 which is fixed with respect to the carcass. In that respect, the adaptor plate 5 can be releasably connected, preferably latched, to the mounting portion 7 which is fixed with respect to the carcass. The adaptor plate 5 can have a plurality of guides 6 (see FIG. 3), by which the adaptor plate 5 can be arranged on the mounting portion 7 at different depthwise positions in the depthwise direction T in relation to the mounting portion 7. Thus, for example, depending on the rear wall of the drawer 3a, for example depending on the thickness of the rear wall, the adaptor plate 5 can be mounted with that guide 6 on the mounting portion 7 which is fixed with respect to the carcass so that, after fixing of the carrier element 12 arranged on the adaptor plate 5, that gives a suitable depthwise position for the ejection device 2 relative to the rear wall of the drawer 3a. It will be appreciated that it is also possible for a plurality of ejection devices 2 to be arranged on the carrier element 12 so that in that way even drawers 3 with a large load capacity can be reliably ejected.

The adaptor plate 5 can also have fixing locations 10 (see FIG. 2) for fixing to a cabinet floor 11 of the furniture carcass 4. If those fixing locations 10 have bores through which the adaptor plate 5 can be screwed to the furniture carcass 4, and if the carrier element 12 has bores 13 (not visible here) which in the mounted position are aligned with the fixing locations 10 of the adaptor plate 5, then, after the ejection device 2 has been positioned, the carrier element 12 and the adaptor plate 5 can be fixed for example with a screw connection to the cabinet floor 11 of the furniture carcass 4 in one working step.

Figure 2:
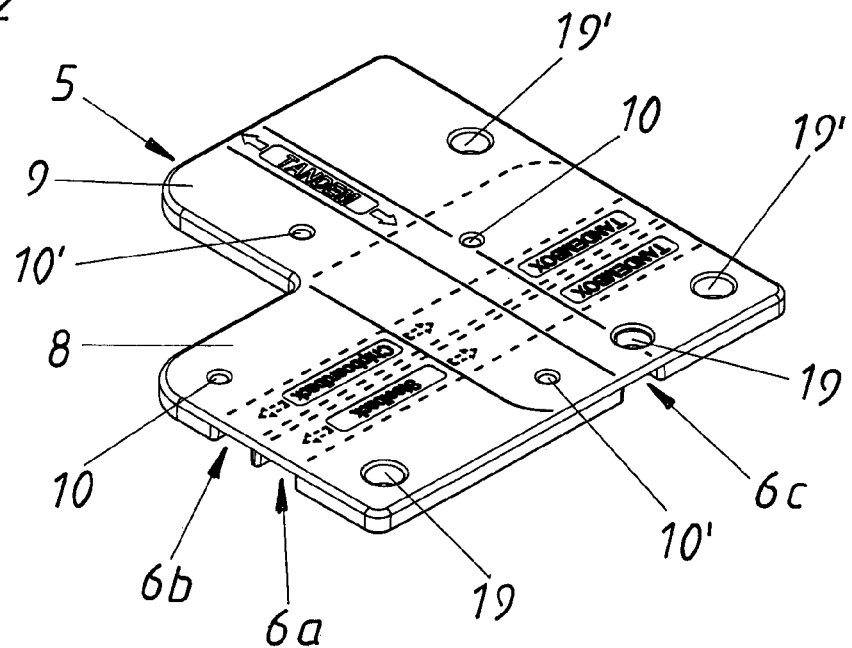
FIG. 2 is a perspective top view of an embodiment of an adaptor plate.

FIG. 2 is a perspective plan view of an example of an adaptor plate 5. In this case, the adaptor plate 5 has a first guide portion 8 and a second guide portion 9 which projects substantially at a right angle from the first guide portion 8. In total, the adaptor plate 5 has three different guides 6a, 6b and 6c, the guides 6a, 6b and 6c being arranged at the underside of the adaptor plate 5 in the mounted position of the latter. The guides 6a and 6b extend along the first guide portion 8 of the adaptor plate 5 and the guide 6c extends along the second guide portion 9 of the adaptor plate 5. Each of the two guide portions, respectively, has two mounting locations 19, 19' for a carrier element 12 to be fixed to the adaptor plate 5. If, for example, the guide 6a or 6b is in use then the two mounting locations 19 are used for mounting the carrier element 12 (not shown here). If the guide 6c is to be used for positioning the ejection device 2 (not shown here) then the carrier element 12 is mounted on the adaptor plate 5 by means of the mounting locations 19'. Accordingly, each guide portion of the adaptor plate 5, respectively, has two fixing locations 10, 10' in order to screw the carrier element 12 for example through the adaptor plate 5 to a cabinet floor 11 (not shown here) of an article of furniture. If the carrier element 12 is mounted to the first guide portion 8 with its two mounting locations 19 then the carrier element 12 is fixed by means of the fixing locations 10 to the cabinet floor 11 (not shown here). If the carrier element 12 is mounted on the second guide portion 9 (at the mounting locations 19') the carrier element 12 can be fixed to the cabinet floor 11 by means of the fixing locations 10'.

Figure 3:
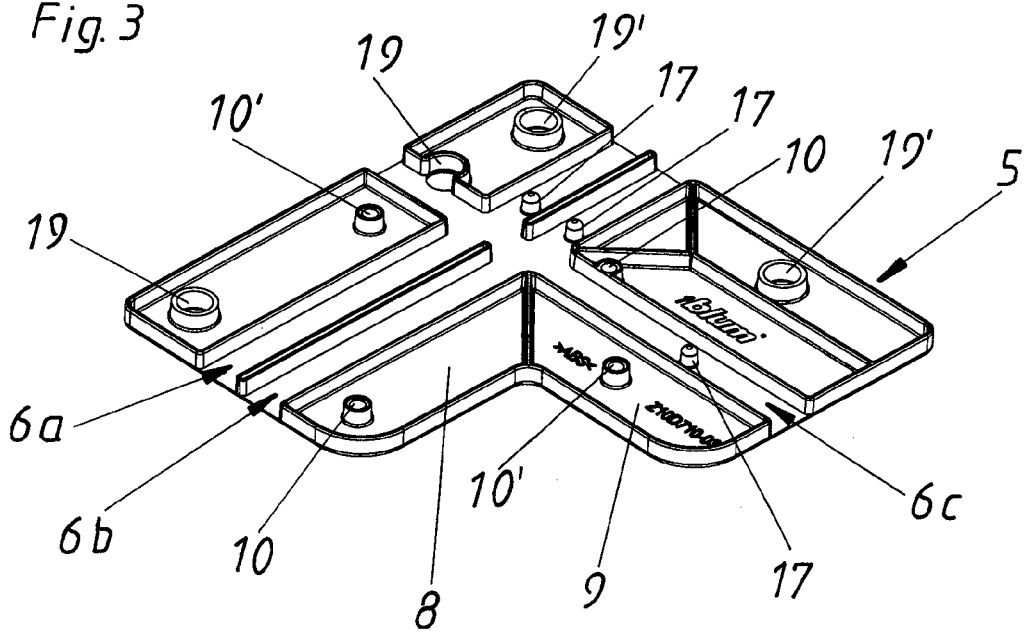
FIG. 3 is a perspective underneath view of the adaptor plate of FIG. 2, FIGS. 4 and 4A are a perspective underneath views of an embodiment of the positioning device.

FIG. 3 shows a perspective underneath view of the adaptor plate 5 of FIG. 2. In this case it is possible to see in particular mounting projections 17 which are arranged in the guides 6a, 6b and 6c and project therefrom and which can respectively engage into a corresponding mounting opening 18 in the mounting portion 7 which is fixed with respect to the carcass (see FIG. 4A), whereby the adaptor plate 5 can be latched to the mounting portion 7.

Figure 4:
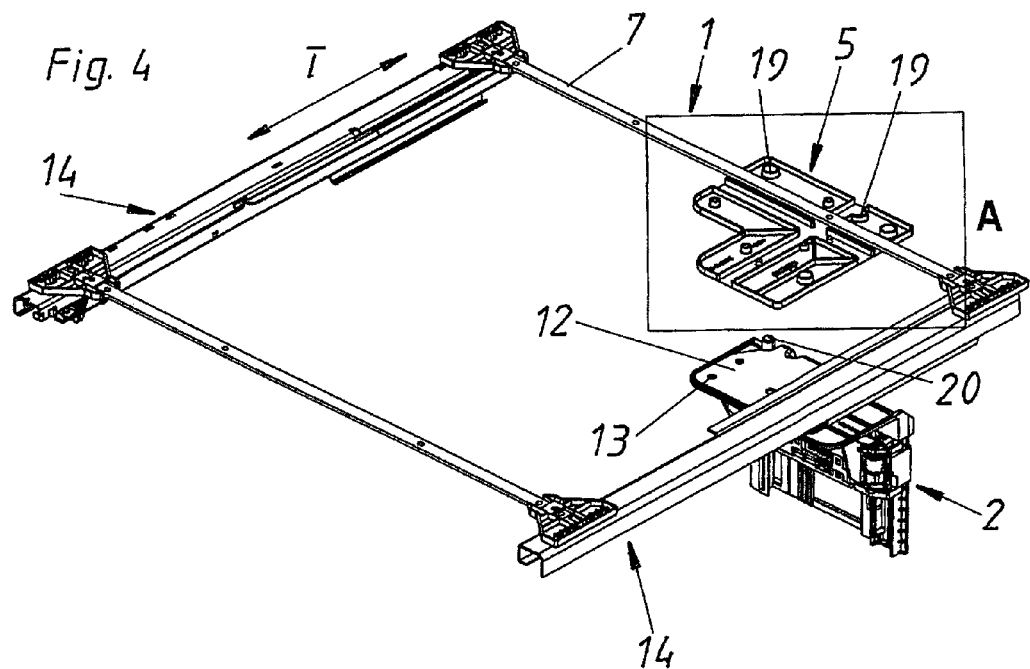
Figure 4A:
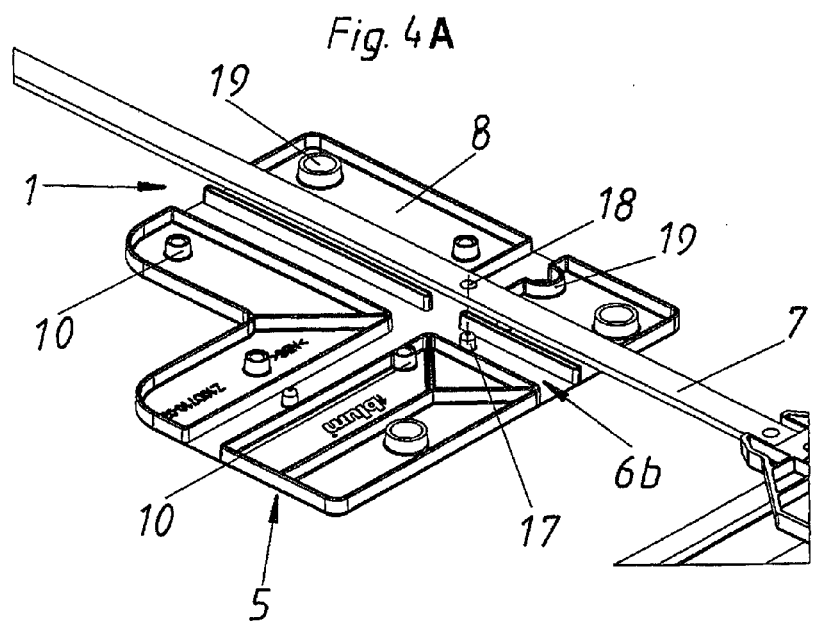

FIG. 4 shows a perspective underneath view of an embodiment of the proposed positioning device 1, and FIG. 4A shows an enlarged detail view therefrom. It is possible to see here two drawer extension guides 14 which extend parallel to each other in the depthwise direction T and a mounting portion 7 which is fixed with respect to the carcass and which is connected to the drawer extension guides 14 in the rear region thereof, extending transversely relative thereto. The mounting portion 7 which is fixed with respect to the carcass has a mounting opening 18 in the form of a hole into which the mounting projection 17 of the guide 6b used here can engage in order to latch the adaptor plate 5 to the mounting portion 7 in a depthwise position defined by the guide 6b, in relation to the mounting portion 7 which is fixed with respect to the carcass. In this case, the guide 6b extends along the first guide portion 8 of the adaptor plate 5. In a corresponding fashion, the two mounting locations 19 of that guide portion 8 are used to mount the carrier element 12 on the adaptor plate 5. In this example, the carrier element 12 has an angled configuration and, on the underside of the portion which is horizontal in the mounted position, it has two corresponding mounting pins 20 by which the carrier element 12 can be latched with the mounting locations 19 of the first guide portion 8 to the adaptor plate 5. Because of the perspective view, it is possible to see only one of the two mounting pins 20 at the underside of the carrier element 12.

FIG. 5 shows a perspective exploded view of an arrangement as shown in FIG. 4. In this example, the guide 6a of the adaptor plate 5 is used to position the ejection device 2 in the depthwise direction T relative to a drawer 3 (not shown here) in the closed end position thereof. In this case, the drawer 3 is mounted movably in the depthwise direction T by the drawer extension guides 14. The ejection device 2 is mounted to a carrier element 12 which is to be connected to the adaptor plate 5. That connection can be made by mounting pins 20 (not visible here) at the underside of the carrier element 12 (see FIG. 4), which are latchable into the mounting locations 19 of the adaptor plate 5. The adaptor plate 5 is positioned with the guide 6a on the mounting portion 7 which is fixed with respect to the carcass and displaced along the mounting portion 7 until the mounting projection 17 of the guide 6a (see FIG. 3) latches at the mounting opening 18 of the mounting portion 7 which is fixed with respect to the carcass. The extension device 2 can be correctly positioned in the depthwise direction T by the guide 6a and the ejection device 2 can be correctly positioned transversely relative to the direction of movement of the drawer 3 by latching of the mounting projection 17 of the guide 6a at the mounting opening 18 so that the ejection element 16 of the ejection device 2 can properly eject the drawer 3. In this example, two screws serve for fixing the carrier element 12 to the cabinet floor 11 (not shown). After fixing of the carrier element 12 on the adaptor plate 5 the bores 13 of the carrier element 12 are aligned with the fixing locations 10 of the adaptor plate 5. In that way, the carrier element 12 and the adaptor plate 5 can be screwed to the cabinet floor 11 with the two screws, through the resulting passage comprising bores 13 and fixing locations 10.

Figure 6:
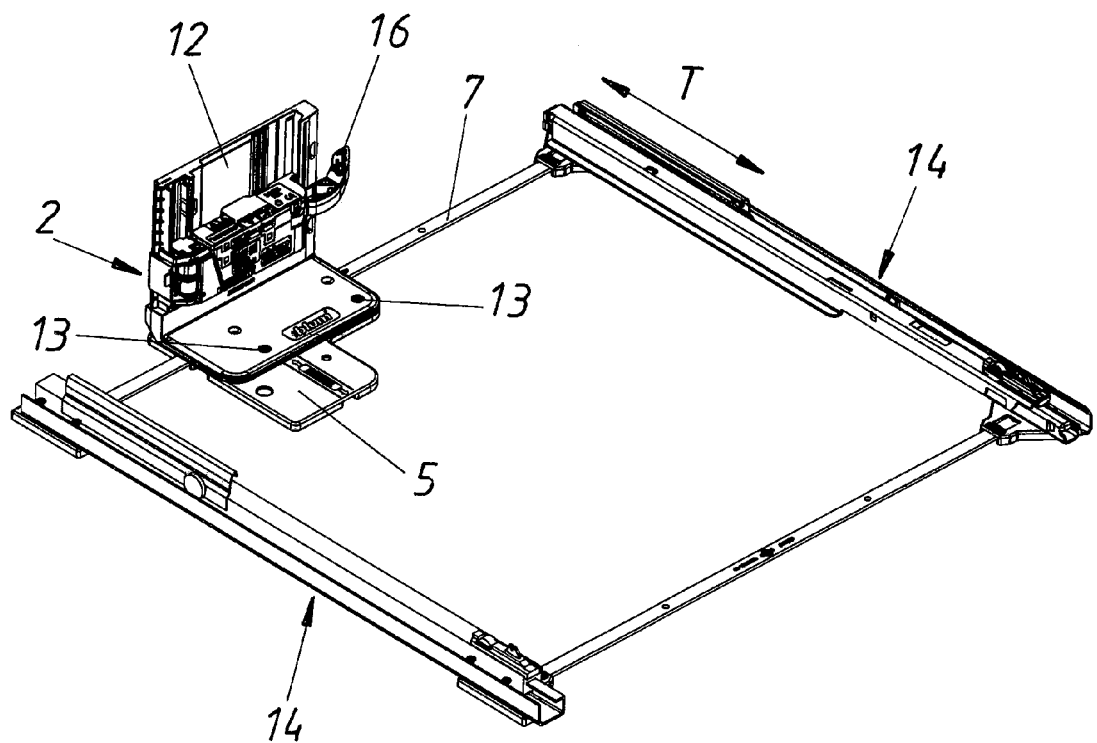
FIG. 6 is a perspective view of an ejection device positioned by the positioning device of FIG. 5, FIGS. 7 and 7A are a plan views of a positioning device.

FIG. 6 shows the arrangement of FIG. 5, wherein the adaptor plate 5 is fixed on the mounting portion 7 which is fixed with respect to the carcass and the carrier element 12 on the adaptor plate 5. Fixing of the carrier element 12 on a cabinet floor 11 (not shown here) can be effected, for example, by the carrier element 12 and the adaptor plate 5 being screwed to the cabinet floor 11 through the bores 13 in the carrier element 12 and the bores 10, which are aligned therewith (see FIG. 5), in the adaptor plate 5.

Figure 7:
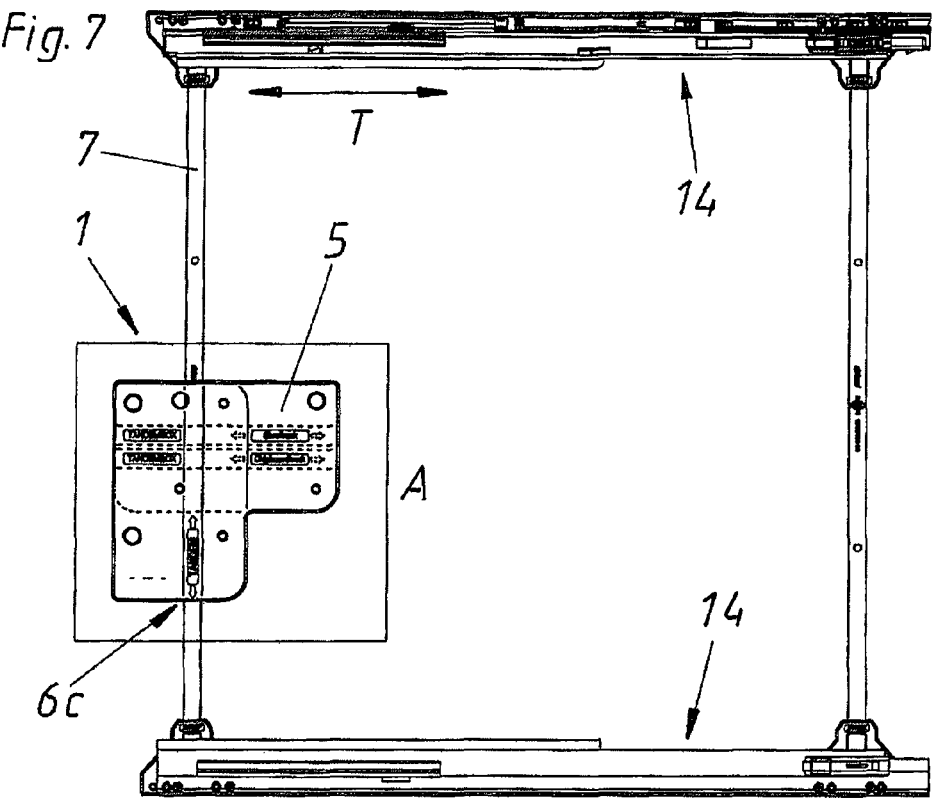
Figure 7A:
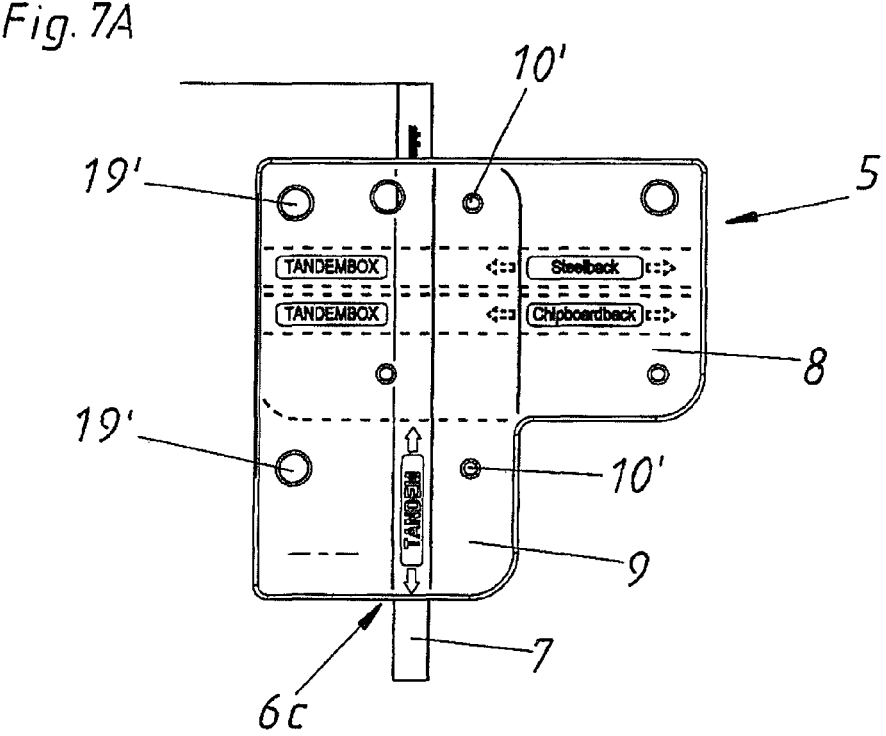

FIG. 7 shows a plan view of a positioning device 1, and FIG. 7A in that connection shows the region A in FIG. 7 on an enlarged scale. In this example, the guide 6c of the adaptor plate 5 is in use. For that purpose, the adaptor plate 5 is turned through 90° in the clockwise direction in comparison with its use as shown in FIG. 5. Here, the adaptor plate 5 is already latched to the mounting portion 7 which is fixed with respect to the carcass, by the mounting projection 17 (not visible here) of the guide 6c of the adaptor plate 5 and the mounting opening 18 of the mounting portion 7. The mounting locations 19' serve for mounting and positioning the carrier element 12 (not shown here) on the adaptor plate 5. The fixing locations 10' serve for fixing the carrier element 12 to the cabinet floor 11 (not shown here).

Figure 8:
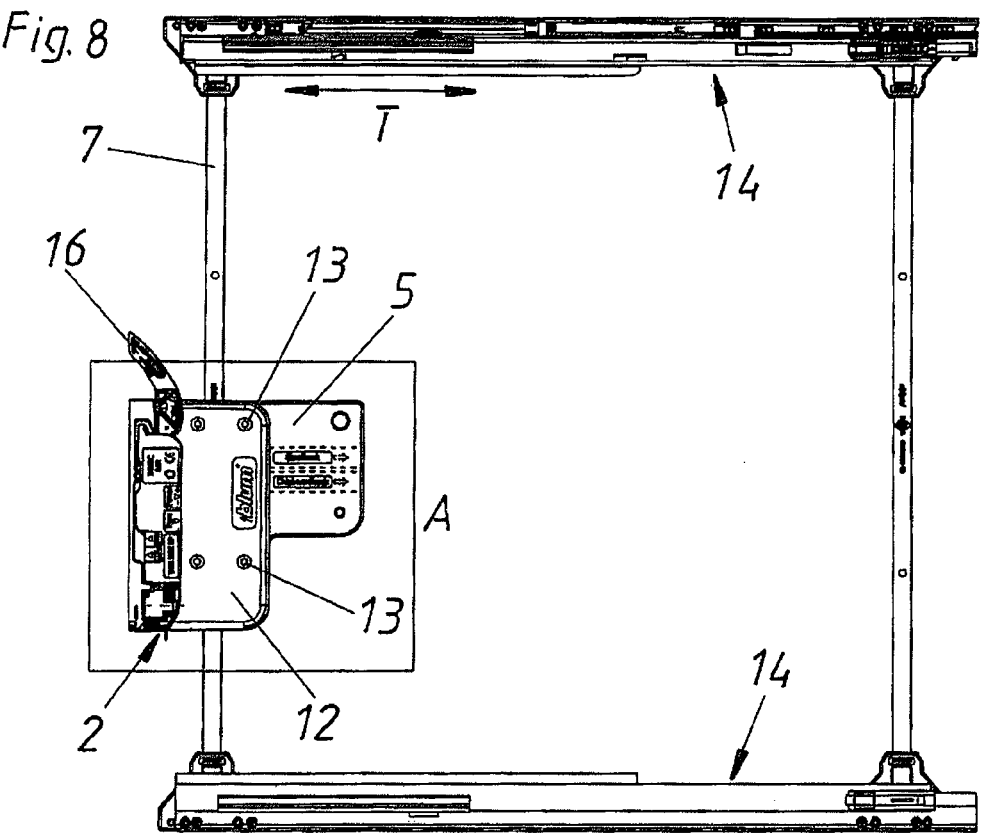
FIGS. 8 and 8A are a plan views of an ejection device positioned by the positioning device of FIG. 7, FIGS. 9 and 9A are a plan views of a further embodiment of a positioning device.
Figure 8A:
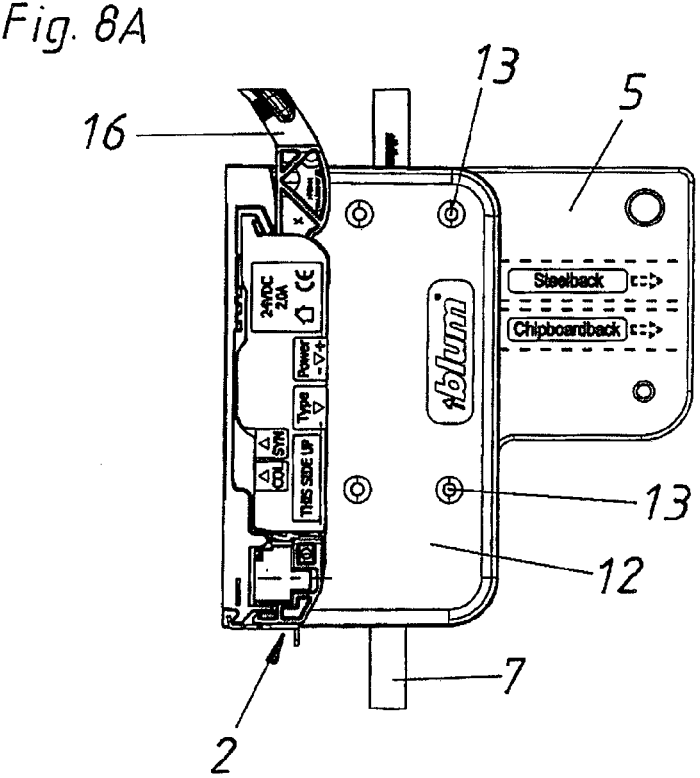

FIGS. 8 and 8A are views in accordance with FIGS. 7 and 7A, with the carrier element 12 being mounted to the adaptor plate 5. In this case, the bores 13 in the carrier element 12 align with the fixing locations 10' of the adaptor plate 5. In that way, the carrier element 12 can be screwed for example to the adaptor plate 5 and the cabinet floor 11 (not shown here).

Figure 9:
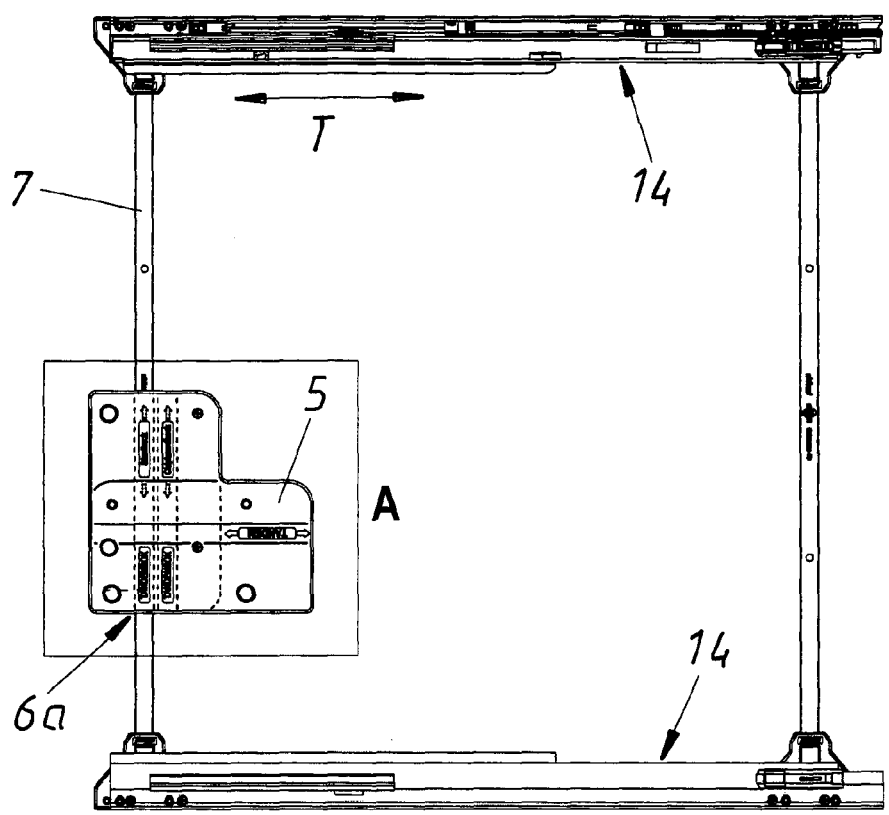
Figure 9A:
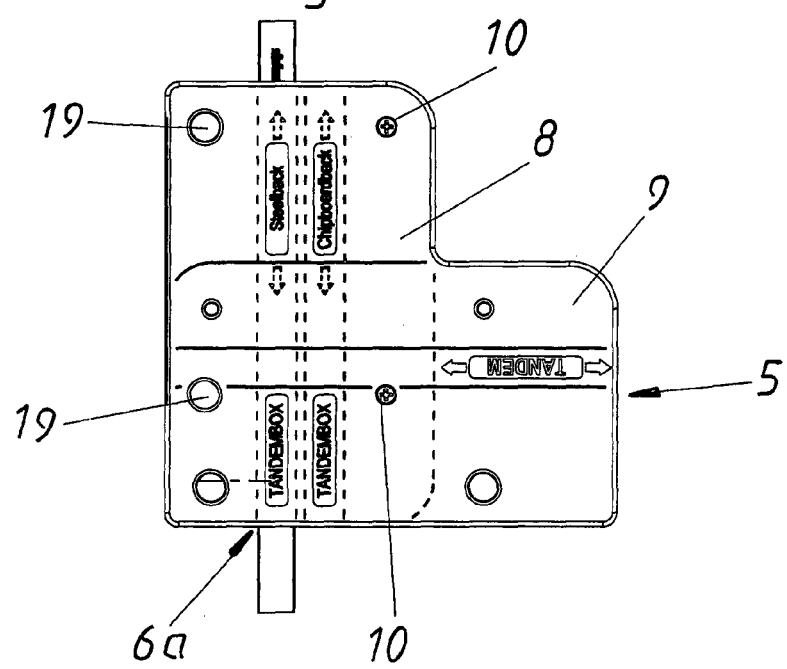
Figure 10:
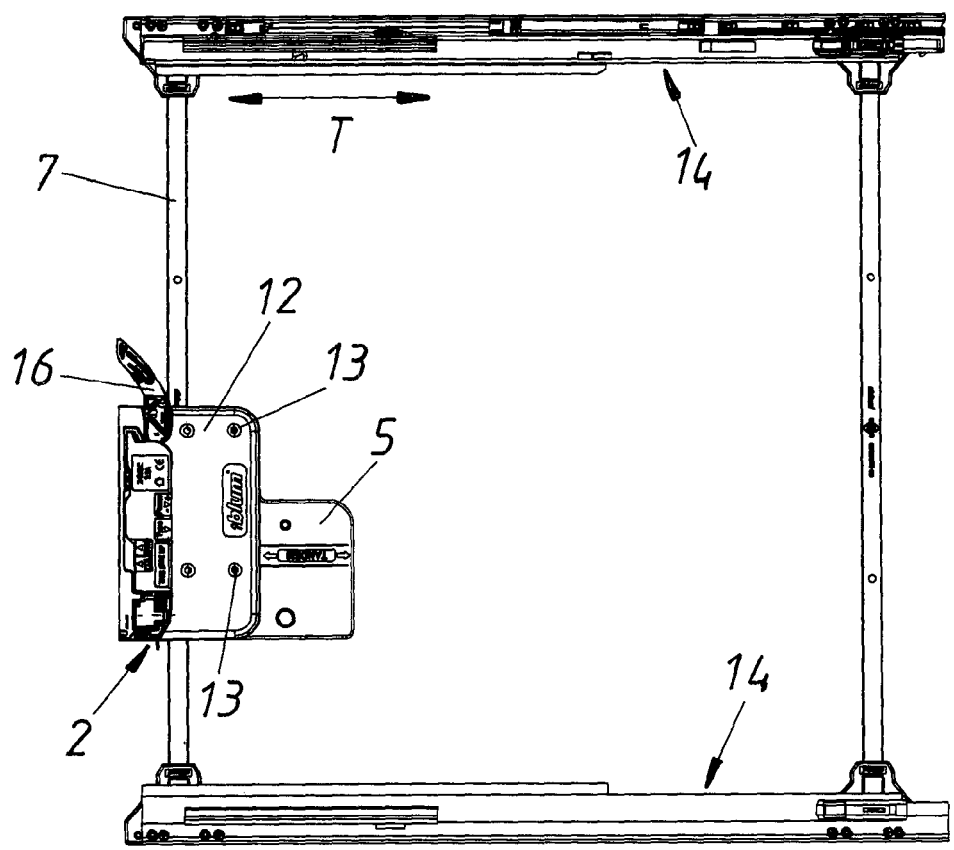
FIG. 10 is a plan view of an ejection device positioned by the positioning device of FIG. 9, FIGS. 11 and 11A are a plan views of a further example of a positioning device.

FIGS. 9, 9A and 10 each show a further positioning of the ejection device 2 by the adaptor plate 5. In this case, the guide 6a of the adaptor plate 5 is in use, thereby affording a different depthwise position in the depthwise direction T for the ejection device 2 relative to the mounting portion 7 which is fixed with respect to the carcass, from that shown in FIG. 8.

Figure 11:
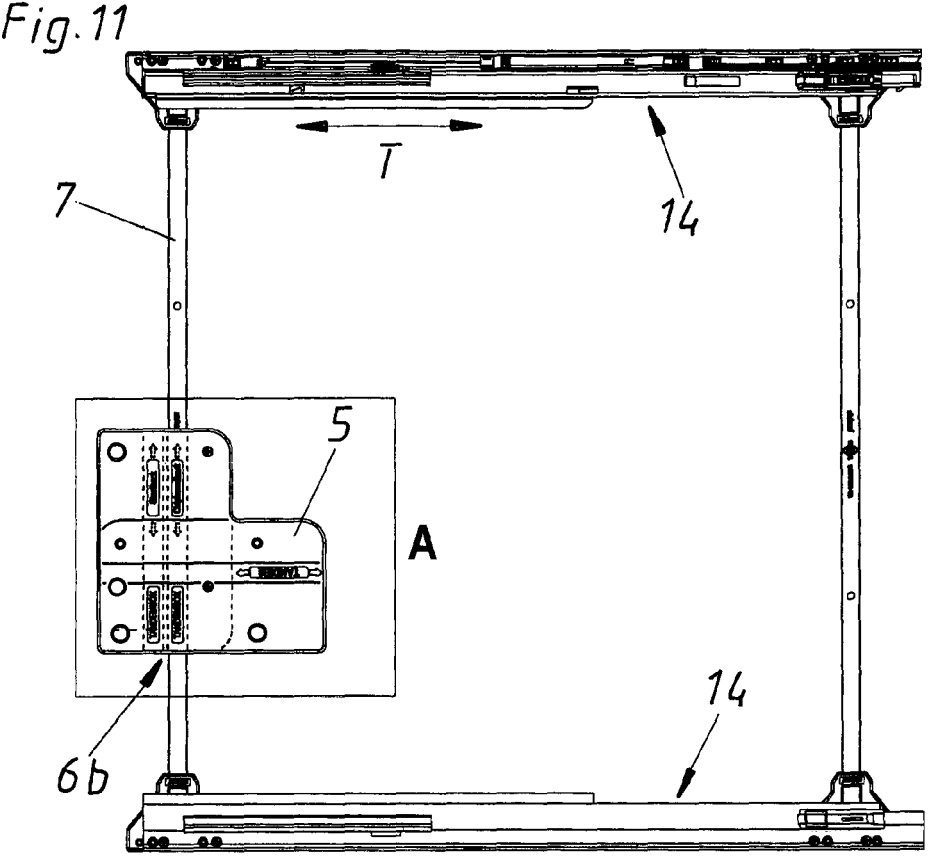
Figure 11A:
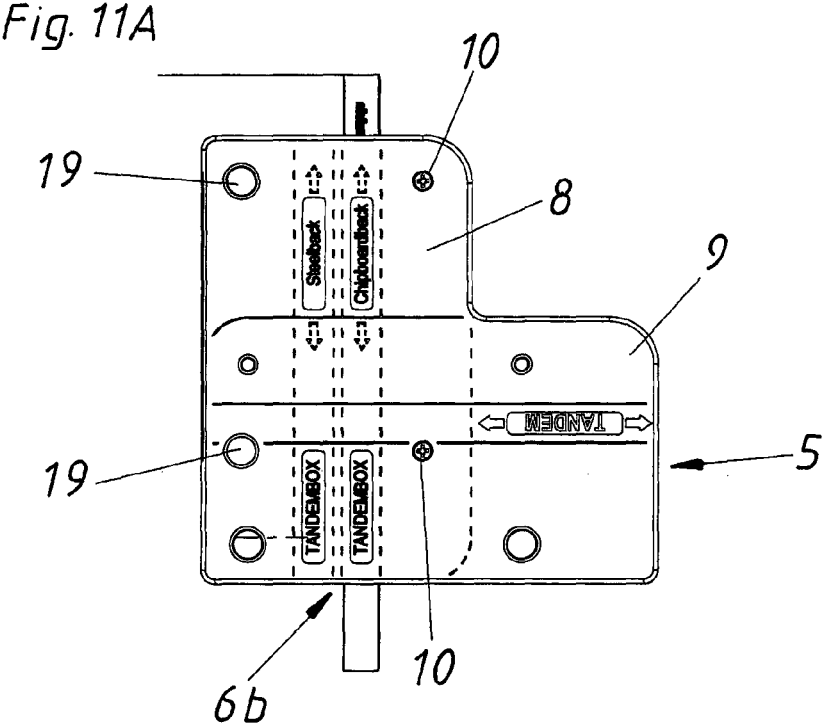

In FIG. 11 positioning of the ejection device 2 (not shown here) is effected by the guide 6b of the adaptor plate 5. In that way, after fixing of the carrier element 12 (not shown here) on the adaptor plate 5, that gives a third different depthwise position for the ejection device 2 in the depthwise direction T relative to the mounting portion 7 which is fixed with respect to the carcass (see FIG. 7 and FIG. 9) and relative to the rear wall of a drawer 3 (not shown here) in its closed end position.

Figure 12:
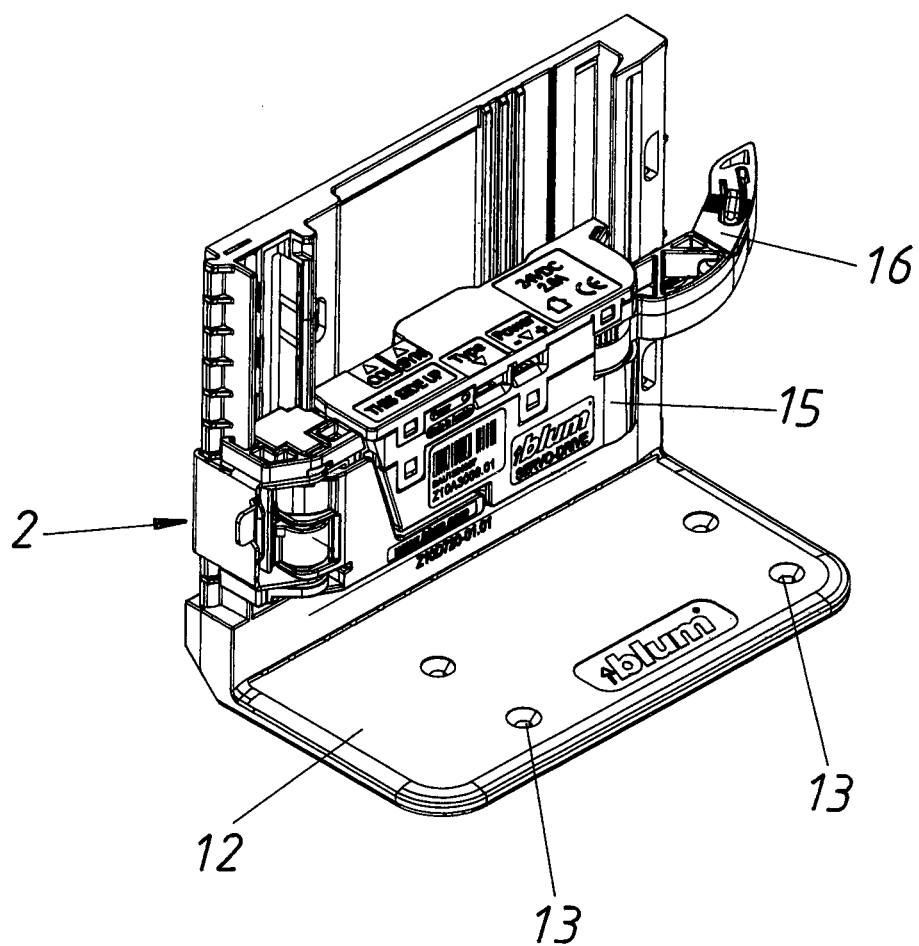
FIG. 12 is a perspective view of a carrier element with an ejection device mounted thereto.

FIG. 12 shows a perspective view of a carrier element 12 with an ejection device 2 mounted thereto. The ejection element 16 is in the form of an ejection lever which can be acted upon by an electric drive 15. Fixing of the carrier element 12 to a cabinet floor 11 (not shown here) can be effected through the bores 13.

Figure 13:
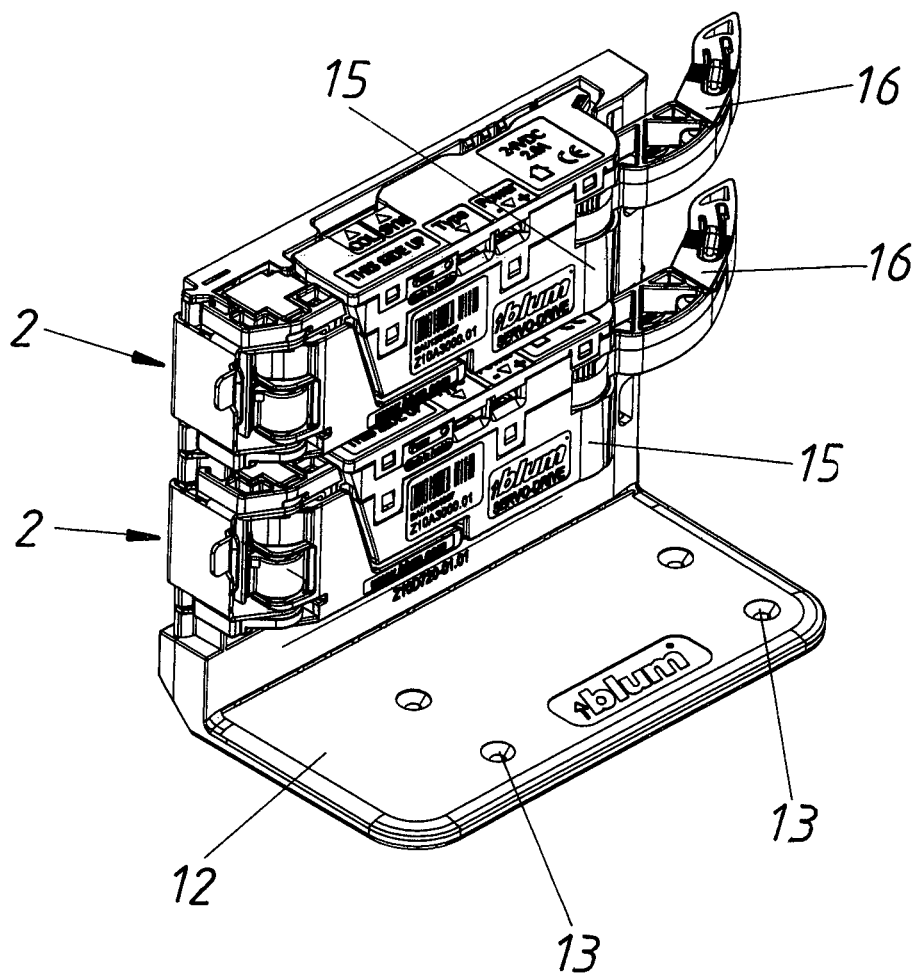
FIG. 13 is a perspective view of the carrier element of FIG. 12 with two ejection devices mounted thereto.

FIG. 13 shows a perspective view of a carrier element 12 as shown in FIG. 12 with a second ejection device 2 which is additionally mounted thereto. Such an arrangement is advantageous in particular when drawers 3 with a large load carrying capacity are to be properly ejected.

The present invention is not limited to the embodiments illustrated by way of example, but embraces or extends to all variants and technical equivalents which can fall within the scope of the appended claims. The positional references adopted in the description such as for example front, rear, transverse and so forth are also related to the directly described and illustrated Figure and are to be appropriately transferred to the new position upon a change in position.

The invention claimed is:

1. A positioning device for positioning an ejection device for ejecting a movably mounted furniture part from a closed end position relative to a furniture carcass, the positioning device comprising:
    an adaptor plate for fixing the ejection device relative to the furniture carcass, the adaptor plate having at least two guides; and
    a mounting portion connected to a respective one of the at least two guides, the mounting portion to be fixed with respect to the furniture carcass and to be fixed to a cabinet floor of the furniture carcass,
    wherein the adaptor plate is configured to position the ejection device by the at least two guides in at least two mutually different depth positions on or in the furniture carcass; and
    wherein the adaptor plate has a first guide portion and a second guide portion projecting substantially at a right angle from the first guide portion.

2. The positioning device as set forth in claim 1, wherein the at least two guides are arranged substantially parallel to each other.

3. The positioning device as set forth in claim 2, wherein the adaptor plate has at least three guides, wherein at least a first one of the at least three guides is arranged substantially at a right angle to at least two of the at least three guides.

4. The positioning device as set forth in claim 1, wherein the adaptor plate is releasably connected to the mounting portion.

5. The positioning device as set forth in claim 4, wherein the adaptor plate is releasably latched to the mounting portion.

6. The positioning device as set forth in claim 1, wherein the adaptor plate has fixing locations for fixing the ejection device to the cabinet floor of the furniture carcass.

7. The positioning device as set forth in claim 6, wherein the fixing locations of the adaptor plate have bores through which the adaptor plate can be screwed to the furniture carcass.

8. The positioning device as set forth in claim 1, further comprising a carrier element connected to the adaptor plate, the ejection device to be mounted to the carrier element.

9. The positioning device as set forth in claim 8, wherein the carrier element has bores which in the mounted condition are aligned with fixing locations of the adaptor plate.

10. The positioning device as set forth in claim 1, wherein the mounting portion is formed as a rail to be connected to two drawer extension guides disposed in opposite relationship on the furniture carcass.

11. An arrangement comprising:
   an ejection device having an ejection element and an electric drive acting upon the ejection element for ejecting a movably mounted furniture part out of a closed end position relative to a furniture carcass; and
   a positioning device connected to the ejection device for positioning the ejection device, the positioning device including:
      an adaptor plate for fixing the ejection device relative to the furniture carcass, the adaptor plate having at least two guides; and
      a mounting portion connected to a respective one of the at least two guides, the mounting portion to be fixed with respect to the furniture carcass and to be fixed to a cabinet floor of the furniture carcass,
   the adaptor plate is configured to position the ejection device by the at least two guides in at least two mutually different depth positions on or in the furniture carcass.

12. An article of furniture comprising:
   a furniture carcass;
   a movably mounted furniture part movable relative to the furniture carcass; and
   an arrangement including:
      an ejection device for ejecting the movably mounted furniture part out of a closed end position relative to the furniture carcass; and
      a positioning device connected to the ejection device for positioning the ejection device, the positioning device including:
         an adaptor plate fixing the ejection device relative to the furniture carcass, the adaptor plate having at least two guides; and
         a mounting portion connected to a respective one of the at least two guides, the mounting portion fixed with respect to the furniture carcass and fixed to a cabinet floor of the furniture carcass,
   the adaptor plate is configured to position the ejection device by the at least two guides in at least two mutually different depth positions on or in the furniture carcass.

* * * * *